(12) United States Patent
Codilian et al.

(10) Patent No.: US 6,975,480 B1
(45) Date of Patent: Dec. 13, 2005

(54) METHOD FOR DETERMINING REPEATABLE RUNOUT CANCELLATION VALUES IN A MAGNETIC DISK DRIVE USING FILTERING

(75) Inventors: Raffi Codilian, Irvine, CA (US); Hemant Melkote, San Jose, CA (US); Vinay K. Agarwal, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 326 days.

(21) Appl. No.: 10/125,007

(22) Filed: Apr. 17, 2002

(51) Int. Cl.$^7$ ............................................. G11B 5/596
(52) U.S. Cl. ................................ 360/77.04; 360/77.08
(58) Field of Search ............................. 360/77.04, 75, 360/77.02, 77.07, 77.08

(56) References Cited

U.S. PATENT DOCUMENTS

| | | | |
|---|---|---|---|
| 4,616,276 A | * | 10/1986 | Workman ................ 360/77.04 |
| 4,890,172 A | | 12/1989 | Watt et al. |
| 5,550,685 A | | 8/1996 | Drouin |
| 5,793,554 A | | 8/1998 | Chainer et al. |
| 5,825,596 A | | 10/1998 | Hikosaka et al. |
| 5,946,158 A | | 8/1999 | Nazarian et al. |
| 5,995,317 A | * | 11/1999 | Ottesen ................ 360/77.04 |
| 6,141,175 A | | 10/2000 | Nazarian et al. |
| 6,166,875 A | * | 12/2000 | Ueno et al. ............... 360/77.04 |
| 6,349,464 B1 | | 2/2002 | Codilian et al. |
| 6,522,495 B1 | * | 2/2003 | Lamberts et al. ........ 360/77.04 |
| 6,549,362 B1 | | 4/2003 | Melrose et al. |
| 2003/0184908 A1 | * | 10/2003 | Hsin ....................... 360/77.04 |

OTHER PUBLICATIONS

Cormen, Thomas H., et al., "Introduction to Algorithms", 1990, pp. 783-800, MIT Press, Cambridge, Massachusetts.

* cited by examiner

Primary Examiner—Andrew L. Sniezek
(74) Attorney, Agent, or Firm—Robroy R. Fawcett, Esq.

(57) ABSTRACT

A method is disclosed for determining repeatable runout (RRO) cancellation values in a disk drive having a head disk assembly (HDA) and a sampled servo controller. The HDA includes a disk having distributed position information in servo wedges, a rotary actuator carrying a head that periodically reads the position information, and a voice coil motor circuit that responds to a control effort signal. The servo controller periodically adjusts the control effort signal during a track-following operation. In the method, the position information related to a predetermined track is read during track following for more than one disk rotation. The position information is averaged for each servo wedge obtained during the disk rotations. The averaged servo position values are filtered with a filter for compensating effects of the sampled servo controller, which tend to distort the averaged servo position values, to generate the RRO cancellation values for the predetermined track.

4 Claims, 7 Drawing Sheets

IDEAL SERVO TRACKS

WRITTEN SERVO TRACKS

METHOD FOR DETERMINING REPEATABLE RUNOUT CANCELLATION VALUES IN A MAGNETIC DISK DRIVE USING FILTERING

BACKGROUND OF THE INVENTION

1. Field of the Invention

The present invention relates to rotating magnetic disk drives, and more particularly, to a method for determining repeatable runout written to a servo track during a servowriting process for accurate track following relative to a concentric track center.

2. Description of the Prior Art

Repeatable runout (RRO) in a disk drive results from imperfections, with respect to a perfect circle, in the location of servo information along a track on a disk surface in the disk drive. Due to disk spindle rotation, the servo imperfections due to RRO are periodic having a fundamental frequency that is equal to the spindle rotation frequency. The RRO imperfections are relatively static over time and the effect of the RRO may be attenuated by measuring the RRO during manufacturing and using the RRO measurements in a head-position servo loop to compensate for the RRO effect.

However, accurate RRO measurements may be difficult to obtain. The head-position servo loop may not be able to track the imperfections or may prevent convergence on cancellation values in a timely and cost effective manner.

Accordingly, there exists a need for technique for determining RRO cancellation values without unnecessarily increasing manufacturing costs or significantly decreasing manufacturing throughput. The present invention satisfies these needs.

SUMMARY OF THE INVENTION

The present invention may be embodied in a method, implemented in a magnetic disk drive, for determining repeatable runout (RRO) cancellation values. The disk drive has a head disk assembly (HDA) and a sampled servo controller. The HDA includes a rotating magnetic disk having distributed position information in a plurality of uniformly spaced-apart servo wedges, a rotary actuator that pivots relative to a base and that carries a transducer head that periodically reads the position information from the servo wedges, and a voice coil motor (VCM) circuit that includes a voice coil motor coupled to the rotary actuator and that responds to a control effort signal. The sampled servo controller periodically adjusts the control effort signal during a track-following operation based on the position information. In the method, the position information related to a predetermined track is read during track following for more than one disk rotation. The position information is averaged for each servo wedge obtained during the disk rotations. The averaged servo position values are filtered with a filter for compensating effects of the sampled servo controller, which tend to distort the averaged servo position values, to generate the RRO cancellation values for the predetermined track.

In more detailed features of the invention, the method for determining RRO cancellation values may further include repeating the reading, averaging and filtering steps for each track to generate RRO cancellation values for each track. Further, filtering the plurality of averaged servo position values may include performing a Fourier transform on the averaged servo position values to generate transformed frequency values, multiplying the transformed frequency values by filter values representing an inverse error rejection function for compensating effects of the sampled servo controller to generate filtered frequency values, and performing an inverse Fourier transform on the filtered frequency values to generate the RRO cancellation values. In another more detailed feature of the invention, filtered frequency values relating to frequencies below and including a second harmonic of a rotational frequency of the disk may be eliminated to generate truncated frequency values. The inverse Fourier transform then may be performed on the truncated frequency values to generate the RRO cancellation values.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
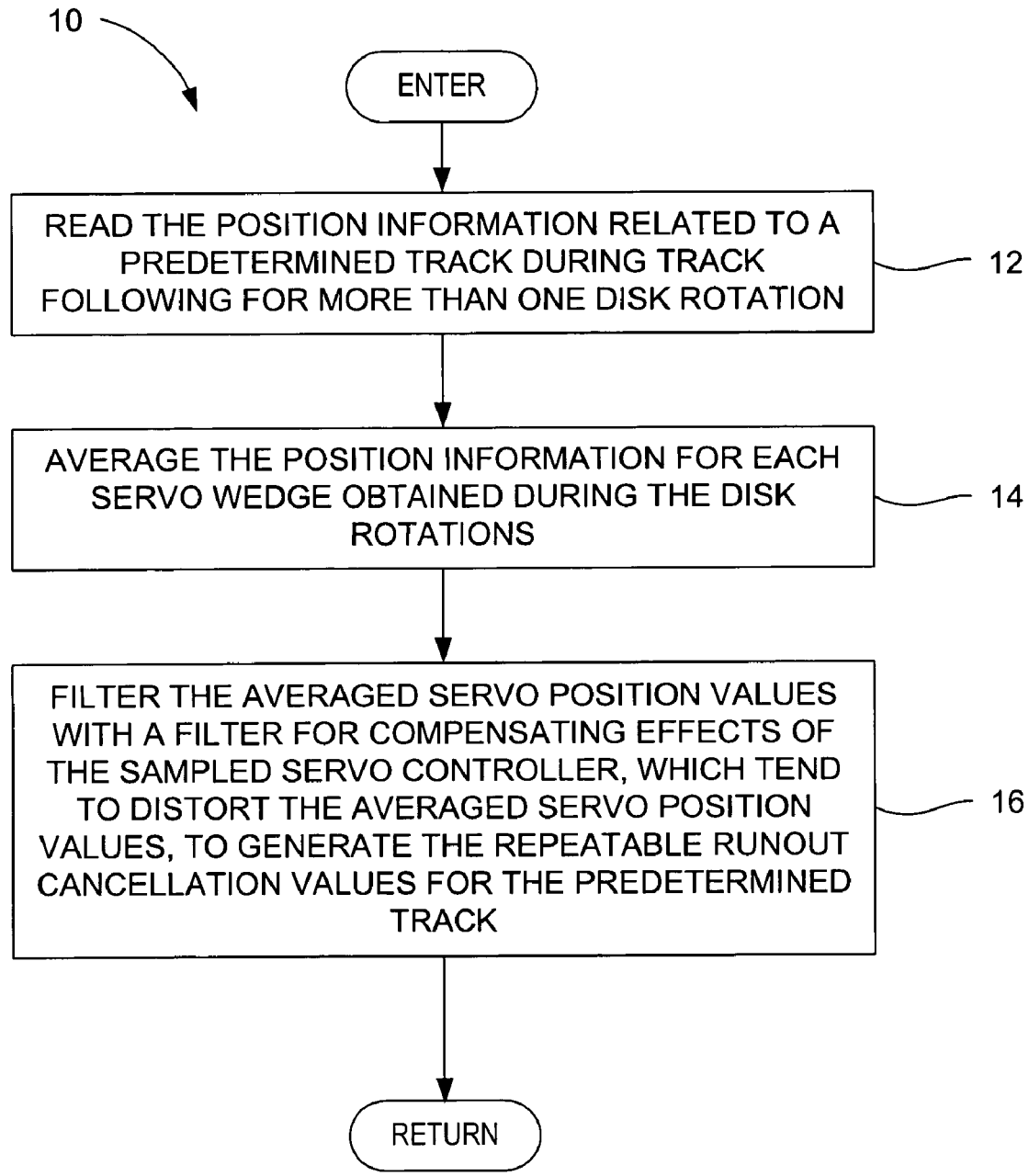
FIG. 1 is a flow chart illustrating an embodiment of a method for determining repeatable runout (RRO) cancellation values in a magnetic disk drive, according to the present invention.
Figure 2:
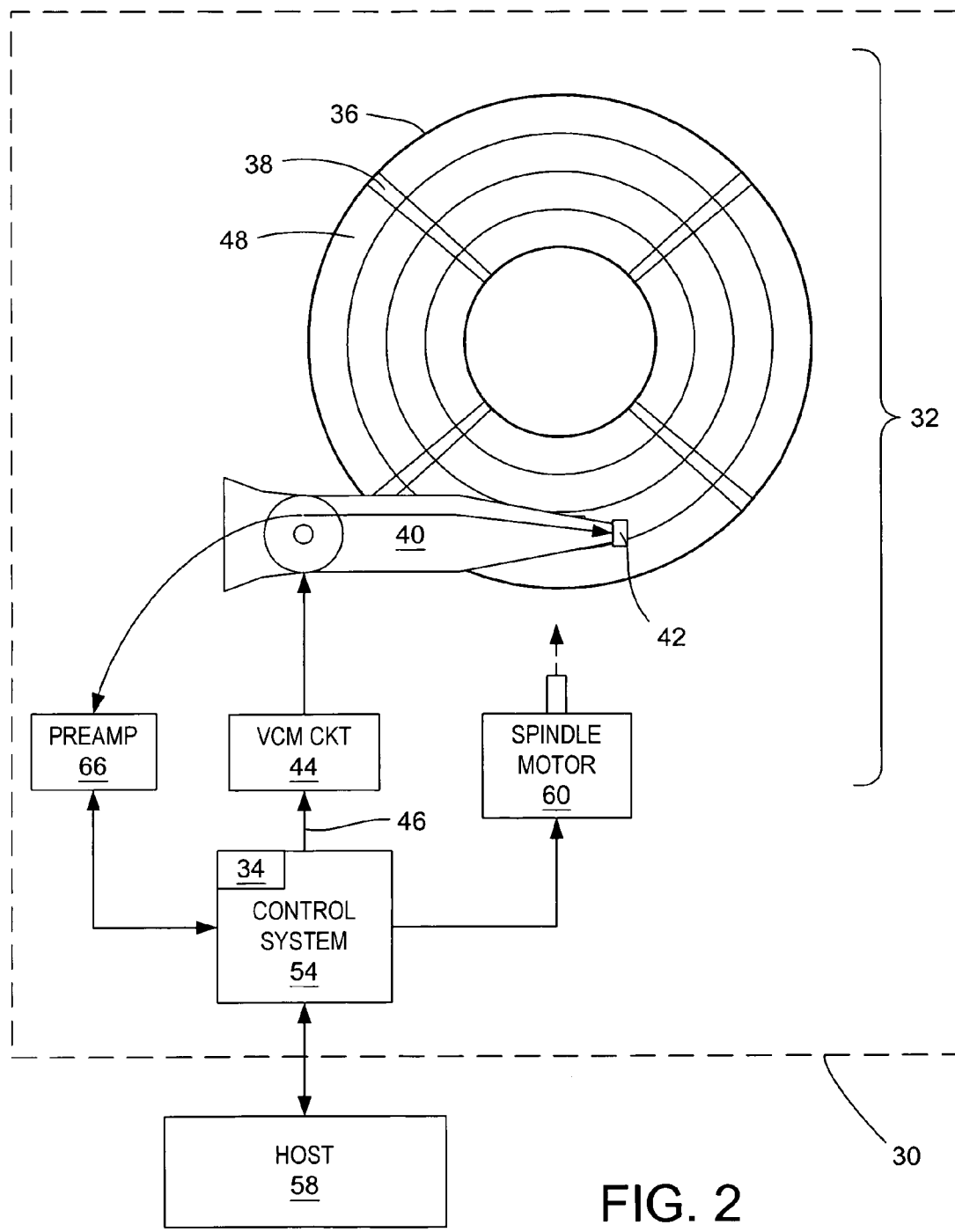
FIG. 2 is a block diagram of a computer system having a disk drive for implementing the determining method of FIG. 1.

With reference to FIGS. 1 and 2, the present invention may be embodied in a method 10 (FIG. 1), implemented in a magnetic disk drive 30 (FIG. 2), for determining repeatable runout (RRO) cancellation values. The disk drive has a head disk assembly (HDA) 32 and a sampled servo controller 34. The HDA includes a rotating magnetic disk 36 having distributed position information in a plurality of uniformly spaced-apart servo wedges 38, a rotary actuator 40 that pivots relative to a base and that carries a transducer head 42 that periodically reads the position information from the servo wedges, and a voice coil motor (VCM) circuit 44 that includes a voice coil motor coupled to the rotary actuator and that responds to a control effort signal 46. The sampled servo controller periodically adjusts the control effort signal during a track-following operation based on the position information. In the method, the position information related to a predetermined track 48 is read during track following for more than one disk rotation (step 12). The position information is averaged for each servo wedge obtained during the disk rotations (step 14). The averaged servo position values are filtered with a filter for compensating effects of the sampled servo controller, which tend to distort the averaged servo position values, to generate the RRO cancellation values for the predetermined track (step 16).

Figure 5A:
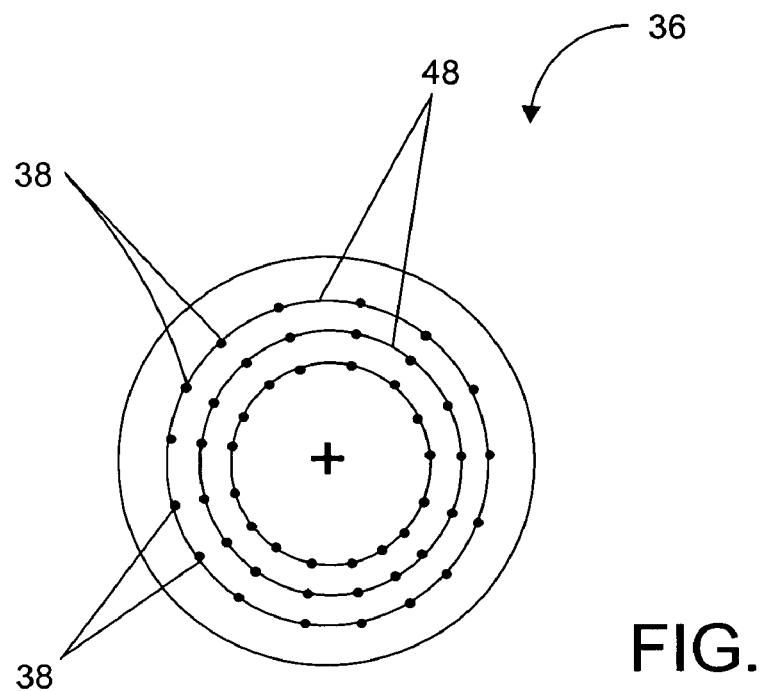
FIG. 5A is a schematic diagram illustrating ideal servo sector tracks on a disk of a disk drive.
Figure 5B:
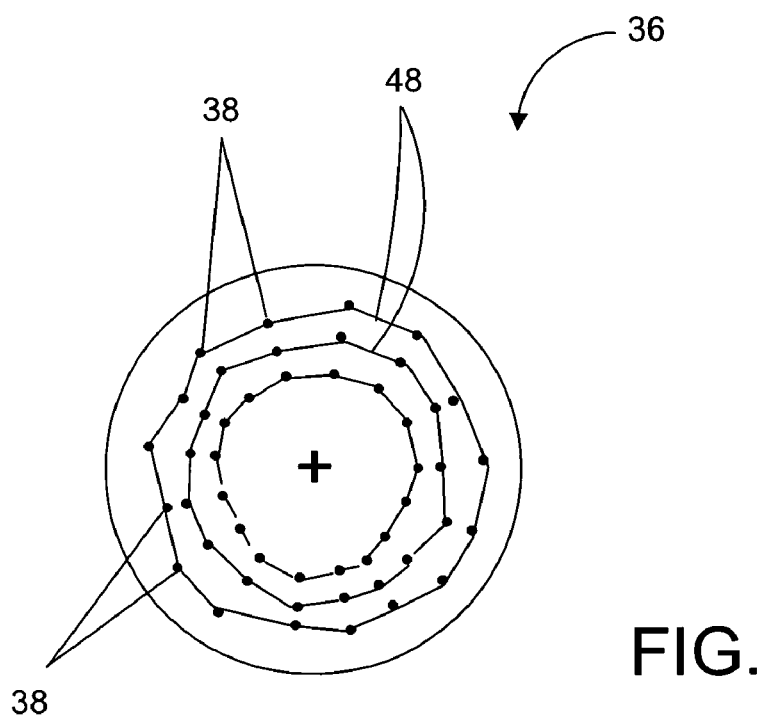
FIG. 5B is a schematic diagram illustrating written servo sector tracks exhibiting RRO.

An ideal track 48 is one that forms a perfect circle on the disk 36 as shown in FIG. 5A. During manufacture, servo information for the embedded servo sectors 38 is placed on the disk during a servo writing operation. The servo information includes servo bursts 38 that are placed at locations that deviate outwardly or inwardly from the ideal "center line" of the track circle as shown in FIG. 5B. These apparent deviations from the ideal track center line can occur due to spindle runout, vibrations or movements during servo writing operation, and media defects or noise in the region of the servo bursts.

The wedge RRO may constitute nearly 50% of total position error signal (PES) variance in a disk drive 30 having high track pitch. Cancellation of the RRO is desired to improve drive performance and achieve higher track densities. Details of particular properties, sources, and aspects of RRO in a magnetic disk drive are provided in U.S. Pat. No. 6,545,835 and U.S. Pat. No. 6,141,175, which are incorporated herein by reference. On a nominal track, improvement in 1 sigma RRO after cancellation value may be about 40% with 5 disk rotations of averaging, and about 70% with 20 disk rotations of averaging, using the RRO cancellation values determined by the method of FIG. 1. The corresponding improvement in the PES variance may be about 30% and 41%, respectively.

The disk drive 30 (FIG. 2) includes a control system 54 and the HDA 32. The control system includes the sampled servo controller 34, and circuitry and processors that control the HDA and that provide an intelligent interface between a host 58 and the HDA for execution of read and write commands. The control system may have an internal microprocessor and nonvolatile memory for implementing the techniques of the invention. Program code for implementing the techniques of the invention may be stored in the nonvolatile memory and transferred to volatile random access memory (RAM) for execution by the microprocessor. The HDA further includes a spindle motor 60, at least one disk 36, and a preamplifier 66.

The magnetic media surface is accessed using the head 42. The tracks 48 on the media surface may be divided into the storage segments. Each storage segment may begin with the servo sector 38 which is followed by data sectors. The data sectors may include data blocks, each generally storing 512 data bytes. Each data block may be addressed using a logical block address (LBA).

Figure 3:
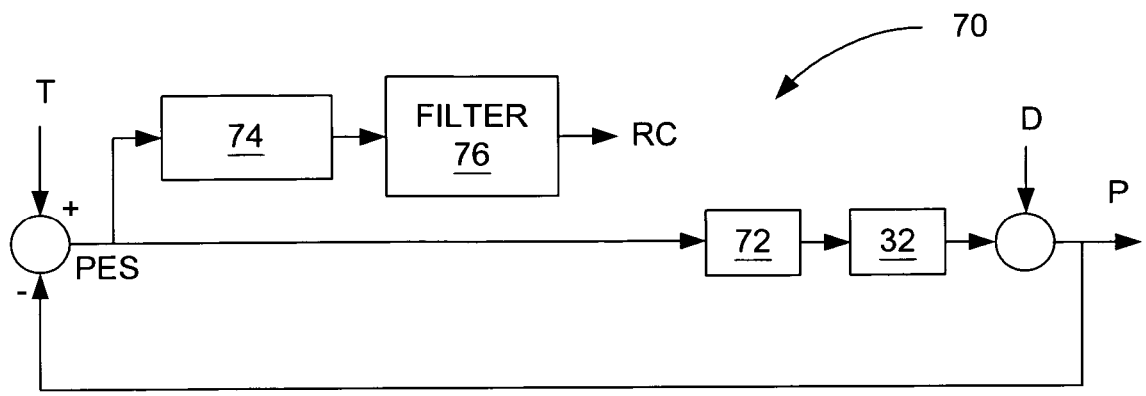
FIG. 3 is a block diagram of a servo control loop, within the disk drive of FIG. 2, for implementing the determining method of FIG. 1.
Figure 4:
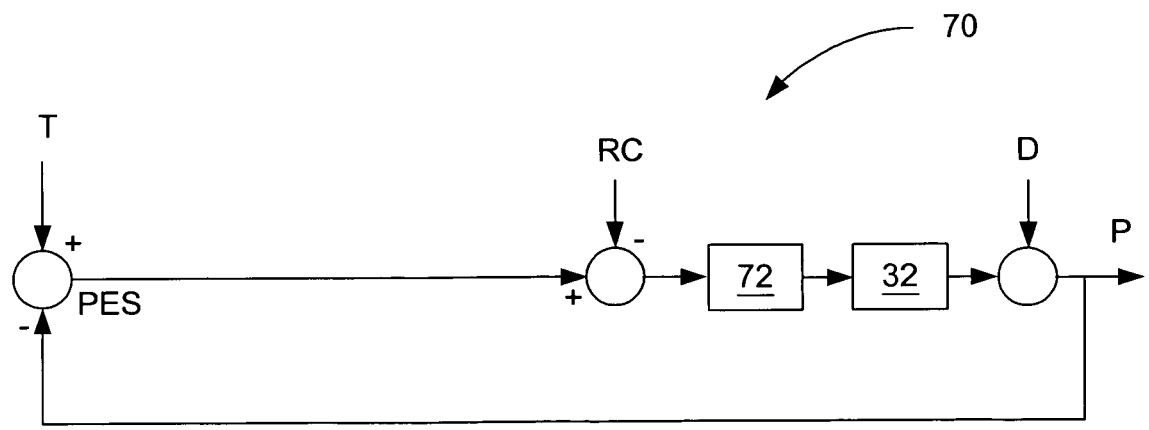
FIG. 4 is a block diagram of a servo control loop, within the disk drive of FIG. 2, for using the RRO values determined by the method of FIG. 1.

With reference to FIG. 3, the servo control loop 70 includes the HDA 32 after a track following compensator 72. Disturbances D to the HDA alter the resulting head position P. A track selection signal T is compared to the head position P to generate a position error signal PES. An averaging device 74 averages the PES for each servo wedge with the PES for subsequent disk rotations to generate the averaged servo position values. The averaged servo position values are filtered by the filter 76 to generate the RRO cancellation values RC. For track following during disk operations, the RRO cancellation values RC modify the PES as shown in FIG. 4.

Figure 6:
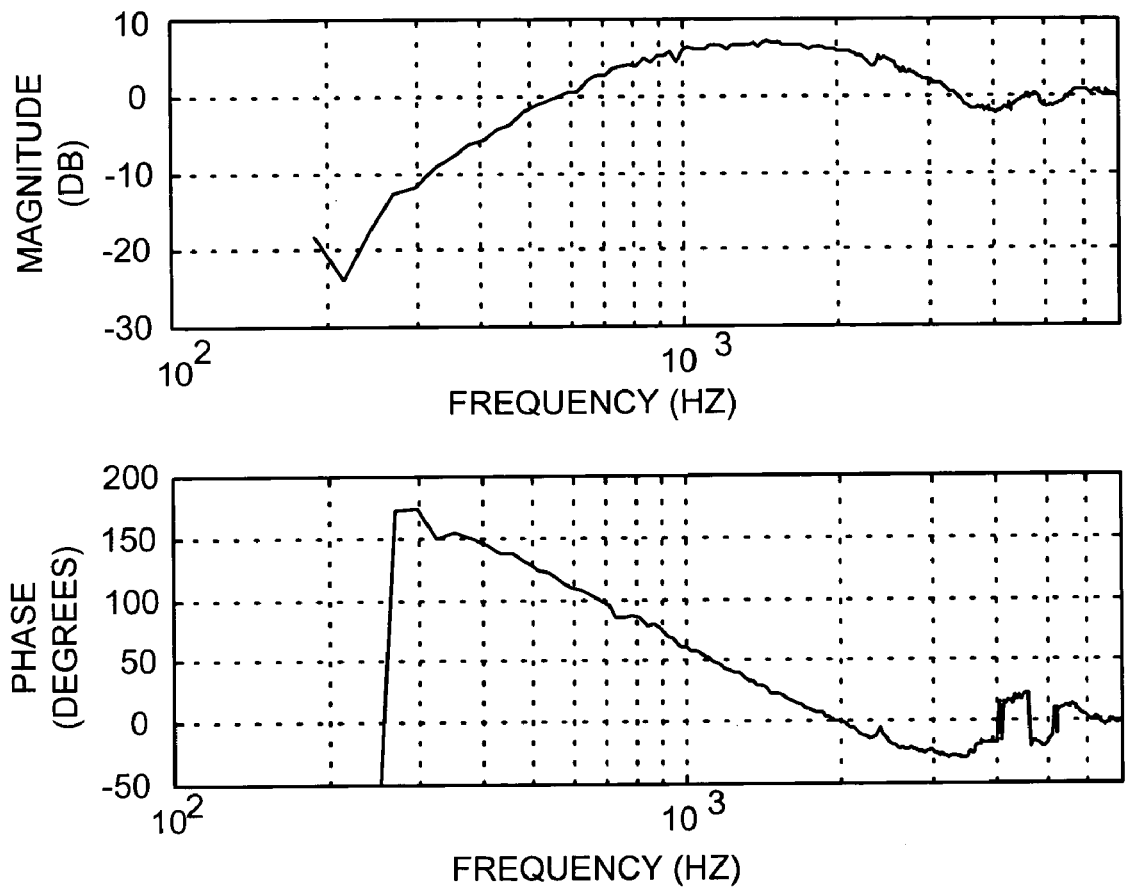
FIG. 6 is a graph showing a plot of magnitude versus frequency for an error rejection function for the servo control loop of FIGS. 3 and 4.
Figure 7:
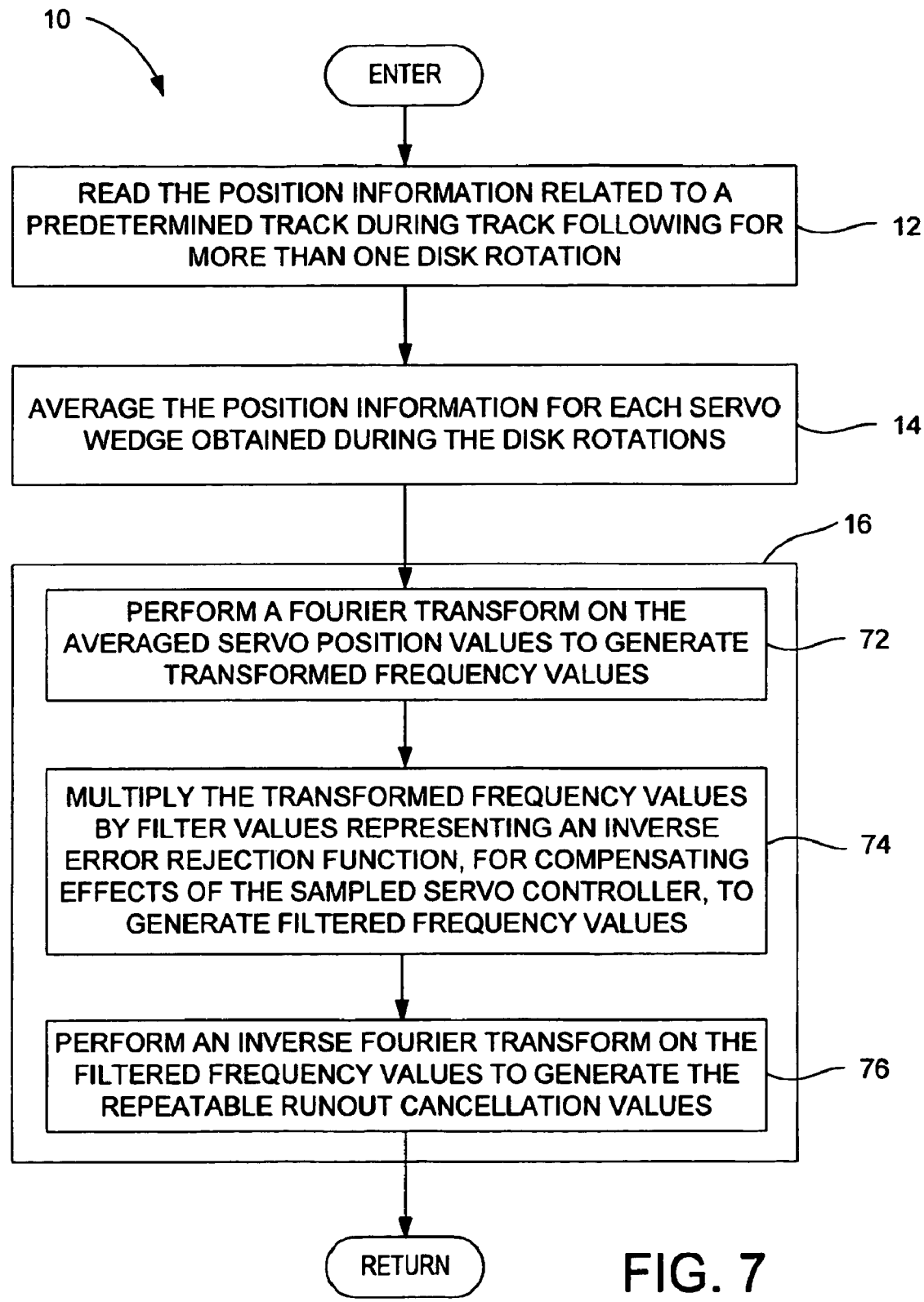
FIG. 7 is a flow chart illustrating a more detailed embodiment of the method for determining repeatable runout (RRO) cancellation values in a magnetic disk drive, according to the present invention.

The method 10 for determining RRO cancellation values may further include repeating the reading, averaging and filtering steps for each track 48 to generate RRO cancellation values for each track. Further, with reference to FIG. 7, filtering the plurality of averaged servo position values (step 16) may include performing a Fourier transform on the averaged servo position values to generate transformed frequency values (step 72), multiplying the transformed frequency values by filter values representing an inverse error rejection function for compensating effects of the sampled servo controller 34 to generate filtered frequency values (step 74), and performing an inverse Fourier transform on the filtered frequency values to generate the RRO cancellation values (step 76). A plot of a representative error rejection function of the servo controller is shown in FIG. 6. The inverse error rejection function compensates for the effects of the servo controller on the average servo position values.

Figure 8:
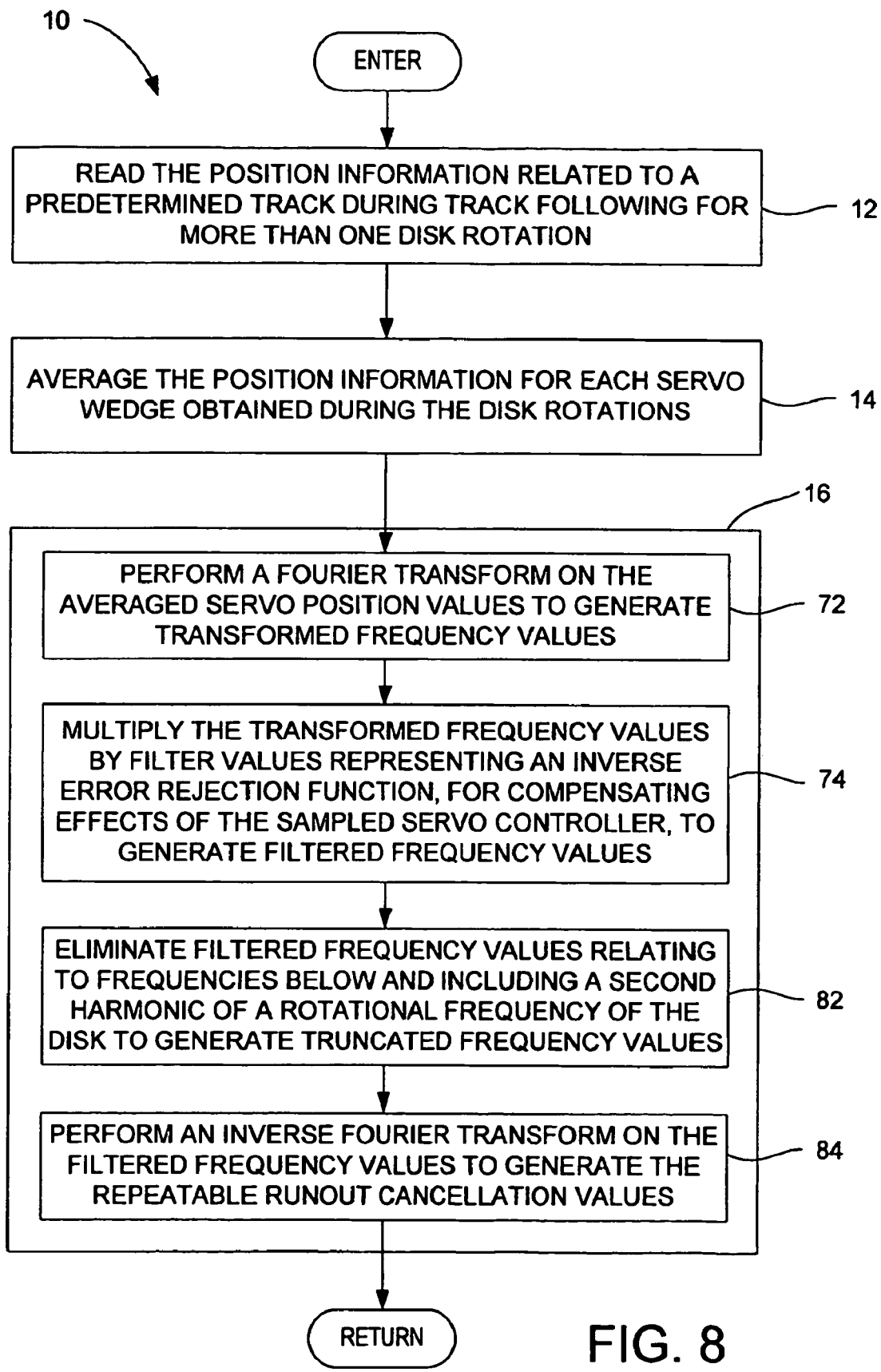
FIG. 8 is a flow chart illustrating another more detailed embodiment of the method for determining repeatable runout (RRO) cancellation values in a magnetic disk drive, according to the present invention.

Also, the RRO related to the first and second harmonics of the disk's rotational frequency may be otherwise readily reduced using, for example, RRO removal techniques disclosed in U.S. Pat. No. 4,616,276, titled DISK FILE SERVO CONTROL SYSTEM WITH FAST REDUCTION OF REPEATABLE HEAD POSITION ERROR. Accordingly, with reference to FIG. 8 the method 10 for determining RRO cancellation values may further include ignoring filtered frequency values relating to frequencies below and including a second harmonic of a rotational frequency of the disk because the RRO at these frequencies has otherwise already been reduced. The ignored filtered frequency values are essentially eliminated leaving truncated frequency values (step 82). The inverse Fourier transform then may be performed on the truncated frequency values to generate the RRO cancellation values (step 84).

We claim:

1. In a magnetic disk drive having a head disk assembly (HDA) and a sampled servo controller, the HDA including a rotating magnetic disk having distributed position information in a plurality of uniformly spaced-apart servo wedges, a rotary actuator that pivots relative to a base and that carries a transducer head that periodically reads the position information from the servo wedges, a voice coil motor (VCM) circuit that includes a voice coil motor that is coupled to the rotary actuator, the VCM circuit responding to a control effort signal, the sampled servo controller for periodically adjusting the control effort signal during a track-following operation based on the position information, a method for determining repeatable runout cancellation values comprising the steps of:

reading the position information related to a predetermined track during track following for more than one disk rotation;

averaging the position information, for each servo wedge, obtained during the disk rotations to generate an averaged servo position value for each servo wedge; and filtering the averaged servo position values with a filter for compensating effects of the sampled servo controller, which tend to distort the averaged servo position values, to generate the repeatable runout cancellation values for the predetermined track, wherein filtering the plurality of averaged servo position values comprises:

performing a Fourier transform on the averaged servo position values to generate transformed frequency values;

multiplying the transformed frequency values by filter values representing an inverse error rejection function, for compensating effects of the sampled servo controller, to generate filtered frequency values; and performing an inverse Fourier transform on the filtered frequency values to generate the repeatable runout cancellation values.

2. In a magnetic disk drive having a head disk assembly (HDA) and a sampled servo controller, the HDA including a rotating magnetic disk having distributed position information in a plurality of uniformly spaced-apart servo wedges, a rotary actuator that pivots relative to a base and that carries a transducer head that periodically reads the position information from the servo wedges, a voice coil motor (VCM) circuit that includes a voice coil motor that is coupled to the rotary actuator, the VCM circuit responding to a control effort signal, the sampled servo controller for periodically adjusting the control effort signal during a track-following operation based on the position information, a method for determining repeatable runout cancellation values comprising the steps of:

reading the position information related to a predetermined track during track following for more than one disk rotation;

averaging the position information, for each servo wedge, obtained during the disk rotations to generate an averaged servo position value for each servo wedge; and filtering the averaged servo position values with a filter for compensating effects of the sampled servo controller, which tend to distort the averaged servo position values, to generate the repeatable runout cancellation values for the predetermined track, wherein filtering the plurality of averaged servo position values comprises:

performing a Fourier transform on the averaged servo position values to generate transformed frequency values;

multiplying the transformed frequency values by filter values representing an inverse error rejection function, for compensating effects of the sampled servo controller, to generate filtered frequency values;

eliminating filtered frequency values relating to frequencies below and including a second harmonic of a rotational frequency of the disk to generate truncated frequency values; and performing an inverse Fourier transform on the truncated frequency values to generate the repeatable runout cancellation values.

3. A magnetic disk drive for determining repeatable runout cancellation values, comprising:

a head disk assembly (HDA) including
a rotating magnetic disk having distributed position information in a plurality of uniformly spaced-apart servo wedges,
a rotary actuator that pivots relative to a base and that carries a transducer that periodically reads the position information from the servo wedges,
a voice coil motor (VCM) circuit that includes a voice coil motor that is coupled to the rotary actuator, the VCM circuit responding to a control effort signal;

a sampled servo controller for periodically adjusting the control effort signal during a track-following operation based on the position information;

means for reading the position information related to a predetermined track during track following for more than one disk rotation;

means for averaging the position information, for each servo wedge, obtained during the disk rotations to generate an averaged servo position value for each servo wedge; and means for filtering the averaged servo position values with a filter for compensating effects of the sampled servo controller, which tend to distort the averaged servo position values, to generate the repeatable runout cancellation values for the predetermined track, wherein the means for filtering the plurality of averaged servo position values comprises:

means for performing a Fourier transform on the averaged servo position values to generate transformed frequency values;

means for multiplying the transformed frequency values by filter values representing an inverse error rejection function, for compensating effects of the sampled servo controller, to generate filtered frequency values; and means for performing an inverse Fourier transform on the filtered frequency values to generate the repeatable runout cancellation values.

4. A magnetic disk drive for determining repeatable runout cancellation values, comprising:

a head disk assembly (HDA) including
a rotating magnetic disk having distributed position information in a plurality of uniformly spaced-apart servo wedges,
a rotary actuator that pivots relative to a base and that carries a transducer that periodically reads the position information from the servo wedges,
a voice coil motor (VCM) circuit that includes a voice coil motor that is coupled to the rotary actuator, the VCM circuit responding to a control effort signal;

a sampled servo controller for periodically adjusting the control effort signal during a track-following operation based on the position information;

means for reading the position information related to a predetermined track during track following for more than one disk rotation;

means for averaging the position information, for each servo wedge, obtained during the disk rotations to generate an averaged servo position value for each servo wedge; and means for filtering the averaged servo position values with a filter for compensating effects of the sampled servo controller, which tend to distort the averaged servo position values, to generate the repeatable runout cancellation values for the predetermined track wherein the means for filtering the plurality of averaged servo position values comprises:

means for performing a Fourier transform on the averaged servo position values to generate transformed frequency values;

means for multiplying the transformed frequency values by filter values representing an inverse error rejection function, for compensating effects of the sampled servo controller, to generate filtered frequency values;

means for eliminating filtered frequency values relating to frequencies below and including a second harmonic of a rotational frequency of the disk to generate truncated frequency values; and means for performing an inverse Fourier transform on the truncated frequency values to generate the repeatable runout cancellation values.

* * * * *